April 7, 1931. W. VAN B. ROBERTS Re. 18,037

MEANS FOR AMPLIFYING ELECTRICAL CURRENTS OF AUDIBLE FREQUENCIES

Original Filed Feb. 26, 1926

INVENTOR
WALTER VAN B. ROBERTS
BY W. S. Grover
ATTORNEY

Reissued Apr. 7, 1931

Re. 18,037

UNITED STATES PATENT OFFICE

WALTER VAN B. ROBERTS, OF PRINCETON, NEW JERSEY, ASSIGNOR TO RADIO CORPORATION OF AMERICA, A CORPORATION OF DELAWARE

MEANS FOR AMPLIFYING ELECTRICAL CURRENTS OF AUDIBLE FREQUENCIES

Original No. 1,759,631, dated May 20, 1930, Serial No. 90,771, filed February 26, 1926. Application for reissue filed July 24, 1930. Serial No. 470,507.

It is well known in the art that in an audio frequency amplifier a gain in quality is secured if the grids of the amplifying tubes are kept at a potential more negative than that of the negative end of the filament. The present invention relates to a novel means for obtaining this negative grid potential. Other purposes and objects may be observed in connection with the annexed specification, claims and drawings in which:—

Figure 1:
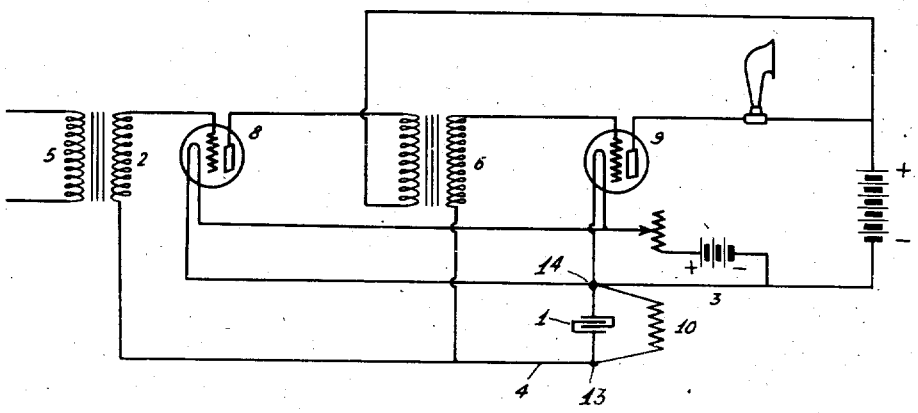
Fig. 1 shows a two stage amplifier.

A condenser (1) of large capacity (I have found that one microfarad is a suitable value) is connected between the common lead (3) to the negative ends of the filaments and the common grid return wire (4) from the secondaries of the transformers. With this arrangement a negative bias of the grids is produced by the signals themselves.

The theory of the operation of this device is as follows:—

The audio frequency currents to be amplified are caused to flow through the primary winding 5 of the first transformer. The successive positive halves of the alternations of potential of the grid end of the secondary winding 6 of the last transformer draw electrons to the grid 9 until condenser 1 is so charged that both transformer secondaries 2 and 6 and both grids 8 and 9 are at a negative potential with respect to the negative filament lead 3 and this negative potential is approximately equal to the peak voltage of the secondary 6 of the last transformer.

If no leakage of charge occurs the grids remain at this negative potential unless stronger signals come along and still further increase the negative potential. In actual practice a permanent negative bias independent of subsequent signals is not secured because no insulation is perfect and even in the best evacuated tubes there are always some positive ions which are attracted to the grids and gradually neutralize the charge on the condenser. Hence, the negative grid potential tends more or less slowly to diminish toward equality with the peak voltage applied. The important fact however is that the negative grid potential never falls appreciably below the peak applied voltage at any time. The action of a grid bias battery differs from the self biasing action described above in that the peak applied voltage may rise far above the voltage of a biasing battery and remain so for any length of time.

It is sometimes desirable to provide a discharge path for the condenser supplementary to that afforded by insulation imperfection and positive ions in the tube, so that if a strong crash of static or other voltage of much greater than normal intensity causes the potential of the grids to assume too great a negative value, the excess charge will leak off in a reasonable length of time. I have found that a resistance of one or two million ohms or more is suitable for this purpose and that it may be connected between grid and negative filament terminal, or in parallel with the condenser as shown in Fig. 1 where the connections to the resistance 10 are shown.

I have explained the invention as applied to a two stage audio frequency amplifier where it serves to maintain equality of bias on the two grids. The scope of the invention is not limited to this case however, as it is equally applicable to any amplifier of more or less than two stages. Furthermore, a multistage amplifier may be considered to be a cascaded combination of amplifiers each of fewer stages, and each of these may have a self biasing device.

The biasing potentials developed by such successive devices will be increasingly great because the signal is increasingly strong in successive sections of the amplifier.

The above described method of self biasing may be advantageously combined with the battery method of grid biasing, by properly inserting a grid battery in series with the self biasing device, so that the grid potential never falls appreciably below the peak value of the impressed voltage nor below the battery voltage.

Figure 2:
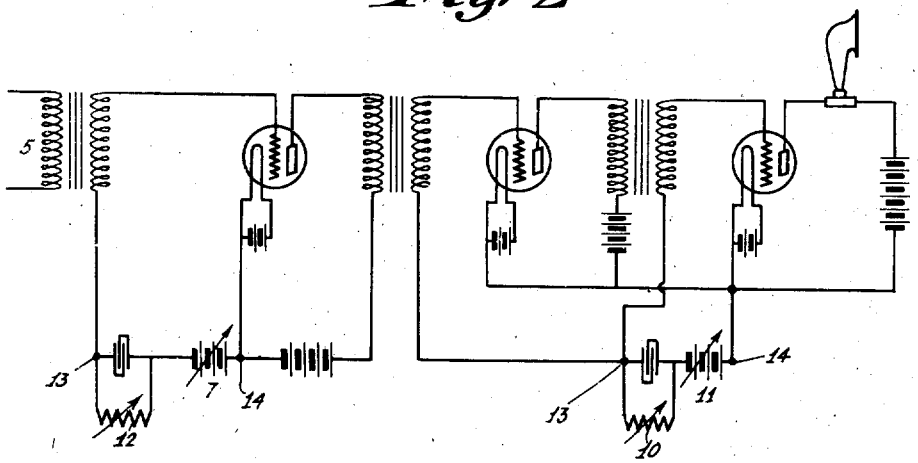
Fig. 2 shows a multi-stage amplifier.

Fig. 2 shows a multistage amplifier embodying self biasing both in a single stage and in a cascaded series of stages, with grid batteries 7 and 11 added which may be chosen to have any voltage, including zero, and high resistances 10 and 12 that may be chosen to have any suitable value.

A convenient arrangement in practice, especially when the grid potential of all the tubes in the amplifier is derived from a single device, is to provide binding posts 13 and 14 between which the condenser can be connected as shown in Fig. 1. These same posts are then available for connecting to a bias battery when desired. Or, between them a bias battery and condenser provided with a suitable high resistance discharge path may be connected in series.

Having thus described my invention, I do not wish to be limited by the exact construction shown but only to the extent of the following claims:—

1. In combination, a series of amplifiers, each having anode, cathode and control electrodes, input and output circuits, the cathodes being conductively connected, the control electrodes being connected to their respective input circuits, the anodes being connected to their respective output circuits, and another connection from the input circuits to the cathodes including a bias condenser and a bias battery for maintaining the numerical value of the average potential difference between the said control electrodes and cathodes substantially equal to the peak value of the signal voltage applied to the control electrodes when said peak value exceeds said battery voltage, and equal to the battery potential when said peak value is less than the battery voltage.

2. In combination in an audio amplifier having anode, cathode and control electrodes, a series connection between the control electrode and the cathode including a bias condenser and a source of constant bias potential for maintaining the numerical value of the average potential difference between said cathode and control electrode greater than or substantially equal to the peak value of the impressed signal voltage, according as the peak value is less than or greater than the voltage of the source of constant bias potential.

3. In combination, in a transformer coupled audio amplifier including a vacuum tube having a cathode and a grid electrode, means for impressing between grid and cathode a steady voltage independent of incoming signals, a condenser in series in the circuit between grid and cathode, and a resistance in shunt relation to the condenser whereby permanent accumulation of charge on the condenser is prevented, said resistance having so high a value that the grid is prevented from drawing appreciable current during intervals when the peak value of signal voltage input exceeds the aforesaid fixed voltage impressed between grid and filament.

WALTER VAN B. ROBERTS.